United States Patent
Keller

(10) Patent No.: US 6,408,874 B1
(45) Date of Patent: Jun. 25, 2002

(54) DEVICE FOR REDUCING SPLASH NOISES IN A FUEL TANK

(75) Inventor: Dieter Keller, Aschaffenburg (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/367,655

(22) PCT Filed: Jan. 29, 1998

(86) PCT No.: PCT/EP98/00458

§ 371 (c)(1),
(2), (4) Date: Nov. 5, 1999

(87) PCT Pub. No.: WO98/36929

PCT Pub. Date: Aug. 27, 1998

(30) Foreign Application Priority Data

Feb. 20, 1997 (DE) .......................................... 197 06 658

(51) Int. Cl.$^7$ ............................................. B60K 15/077
(52) U.S. Cl. ..................... 137/574; 137/573; 137/576
(58) Field of Search ................. 137/574, 573, 137/576, 561

(56) References Cited

U.S. PATENT DOCUMENTS

| | | | | |
|---|---|---|---|---|
| 4,152,796 A | * | 5/1979 | Fogel | 5/682 |
| 4,179,036 A | * | 12/1979 | Pasini | 220/563 |
| 4,210,176 A | * | 7/1980 | Emming | 137/573 |
| 4,324,272 A | * | 4/1982 | Parks et al. | 137/574 |
| 4,453,564 A | * | 6/1984 | Bergesio | 137/574 |
| 4,858,778 A | * | 8/1989 | Patrick | 220/562 |
| 5,031,795 A | * | 7/1991 | Kotera et al. | 220/563 |
| 5,127,432 A | * | 7/1992 | Duhaime et al. | 137/574 |
| 5,779,092 A | * | 7/1998 | Hehn et al. | 220/563 |
| 5,983,945 A | * | 11/1999 | Salmon | 137/899.2 |

FOREIGN PATENT DOCUMENTS

| | | |
|---|---|---|
| DE | 861969 C | 1/1953 |
| DE | 2847117 A | 5/1980 |
| DE | 3905611 A1 | 2/1989 |
| DE | 29606124 U1 | 2/1996 |
| FR | 2453045 A1 | 4/1980 |
| WO | 9305975 A1 | 9/1992 |

OTHER PUBLICATIONS

Patent Abstracts of Japan, vol. 097, No. 001, Jan. 31, 1997, & JP 08 244481 A (Daihatsu Motor Co Ltd), Sep. 24, 1996.
Patent Abstracts of Japan, vol. 009, No. 282 (M–428), Nov. 9, 1985, & JP 60 124522 A (Nissan Jidosha KK), Jul. 3, 1985.

* cited by examiner

*Primary Examiner*—John Rivell
(74) *Attorney, Agent, or Firm*—David M. Thimmig; Mayer, Brown, Rowe & Maw

(57) ABSTRACT

Arranged in a fuel tank of a motor vehicle are guide elements and guide plates which deflect a flow of the fuel toward a wall of the fuel tank at a flat angle. Splashing noises of the fuel are thereby markedly reduced. The guide plates form a channel with a calming region, in which the flow of the fuel is throttled.

6 Claims, 2 Drawing Sheets

DEVICE FOR REDUCING SPLASH NOISES IN A FUEL TANK

BACKGROUND OF THE INVENTION

The invention relates to a device for the reduction of splashing noises in a fuel tank of a motor vehicle, with damping elements arranged in the fuel tank.

Such devices are often used, for example in racing vehicles, and are therefore known. In these, the damping elements are frequently designed as baffles arranged in the fuel tank. The baffles subdivide the fuel tank into a plurality of chambers. The fuel accelerated in the direction of a wall of the fuel tank first flows around a baffle arranged in front of said wall, before it comes up against the latter.

A disadvantage of the known fuel tanks is that disturbing splashing noises occur in the fuel tank despite the fact that baffles are arranged in the latter. In the most unfavorable situation, the baffles of the known device may even cause splashing noises when fuel sloshes against the baffles or when the baffles deflect the flow of fuel perpendicularly onto the wall of the fuel tank.

SUMMARY OF THE INVENTION

The problem on which the invention is based is to design a device of the type initially mentioned, in such a way that it reduces disturbing splashing noises to as great an extent as possible.

This problem is solved, according to the invention, in that the damping elements are designed as guide elements and/or guide plates for deflecting the flow of fuel onto the wall of the fuel tank at an angle different from 90° and/or for throttling the velocity of the flow.

Perpendicular impingement of a strong flow is avoided by virtue of this design. The splashing noises which occur are the lower, the flatter the angle is, at which the flow is deflected onto the wall and the lower the flow velocity of the fuel is. The fuel deflected by the guide elements or the guide plates subsequently flows virtually silently along the wall. Splashing noises in the fuel tank are thereby markedly reduced. If there is simultaneous throttling of the flow velocity and deflection of the flow of fuel, the splashing noises are avoided almost completely.

According to an advantageous development of the invention, the flow of fuel can be deflected into an intended direction in a simpler way if the guide plates form a channel relative to one another or to the bottom of the fuel tank. In this case, the guide plates are arranged at a flat angle to the direction of flow, so that disturbing splashing noises do not occur when the flow impinges onto the guide plates.

According to another advantageous development of the invention, the flow velocity of the fuel is throttled if the channel has a cross-sectional widening as a calming region. In the simplest instance, the guide plates are arranged at a short distance from the bottom of the fuel tank and ascend towards the lateral walls of the fuel tank. In this case, fuel flowing through under the guide plates is throttled in the calming region and fuel flowing over and beyond the guide plate is deflected upward. Further guide elements provided for deflecting the flow may be arranged, for example, on the guide plates or on the bottom of the fuel tank.

Particularly loud splashing noises occur when the motor vehicle is being braked or accelerated. According to another advantageous development of the invention, these splashing noises can be damped to a particularly great extent if guide plates forming channels are arranged in each case in a front region and in a rear region of the fuel tank.

According to another advantageous development of the invention, the velocity of the fuel flowing over the guide plates is throttled if a funnel-shaped inflow region is arranged upstream of the calming region. Moreover, as a result of the funnel-shaped design, the fuel is fed uniformly to the calming region when there are different filling levels in the fuel tank.

According to another advantageous development of the invention, the flow velocity of the fuel can be further reduced if an outflow region with a cross section larger than the cross section of the calming region is arranged downstream of said calming region.

According to another advantageous development of the invention, a contribution is made to further reducing the splashing noises in the fuel tank if the guide elements are arranged on the flow-side end of the channel.

If the filling level of fuel in the fuel tank were to cover the guide plates, some of the fuel flowing over said guide plates could bounce against the wall of the fuel tank and cause splashing noises. It would be conceivable likewise to arrange on the top side of the guide plates guide elements which deflect the fuel flowing over the guide plates onto the wall at a flat angle. However, according to another advantageous development of the invention, such guide elements to be additionally provided can be avoided if the guide elements have a scoop-shaped design in order to reverse the direction of flow of the fuel flowing out of the channel. That portion of the fuel which flows over the guide plates is thereby deflected by the fuel which has been deflected by the guide scoops provided for the reversal of flow.

According to another advantageous development of the invention, the fuel leaves the calming region at a particularly low velocity if at least one of the guide elements is arranged in the calming region.

According to another advantageous development of the invention, the splashing noises are particularly low if a damming element oriented essentially perpendicularly to the direction of flow is arranged in the calming region. In this case, the damming element reduces the flow velocity in the calming region. Further guide elements for deflecting the previously slowed flow may subsequently be provided.

A contribution is made to further reducing the splashing noises in the case of different filling levels in the fuel tank if the guide plates are arranged at different heights and essentially parallel to the bottom of the fuel tank. In this case, if the fuel tank is virtually full, the uppermost guide elements prevent the splashing noises, whilst, if the fuel tank is nearly empty, the lowermost guide elements deflect the flow so as to reduce the noise.

According to another advantageous development of the invention, the flow in the fuel tank is deflected onto the lateral wall of the fuel tank at a flat angle, virtually without swirling, if the guide elements have a wing-shaped design.

The directions of the flow causing the splashing noises in the fuel tank cannot often be reliably foreseen. According to another advantageous development of the invention, splashing noises occurring when the flow impinges perpendicularly onto a guide element or a damming element can be reduced in a simple way if the guide elements or the damming elements have a multiplicity of passages. By virtue of this design, some of the fuel impinging perpendicularly onto the guide scoops can flow through the passages. The impingement of the flow is thereby damped to a great extent. However, a flow impinging obliquely onto the guide elements provided with passages is largely deflected into the intended direction.

According to another advantageous development of the invention, a sharp impingement of the fuel onto the guide elements can be damped in a simple way if the guide elements are designed resiliently.

According to another advantageous development of the invention, the flow is deflected according to the flow intensity if the guide elements have a resilient arm and if a guide wing is fastened to the resilient arm.

A direction of flow of the fuel in the fuel tank which generates splashing noises can be avoided in a simpler way if the device according to the invention has flap valves for throttling a flow of the fuel in one direction.

The device according to the invention can be produced particularly cost-effectively if the guide elements and/or the guide plates are manufactured in one piece with a wall or a bottom of the fuel tank. This is advantageous particularly in the case of fuel tanks manufactured from plastic by the injection molding method, since the guide elements and/or the guide plates can be provided at the same time as when the fuel tank is produced.

Current fuel tanks usually have, on their top side, an orifice provided for the insertion of a feed unit. The guide elements can be inserted in such fuel tanks in a simple way if said guide elements are intended to be led through an orifice worked in the wall of the fuel tank. This is advantageous particularly in the case of fuel tanks manufactured by the blowing method, since, after blowing, the guide elements can be positioned particularly reliably.

The guide elements and/or the guide plates may, for example be firmly screwed or firmly clamped in the fuel tank. However, according to another advantageous development of the invention, the guide elements and/or the guide plates are fastened particularly durably in the fuel tank if they are welded to the bottom or a wall of said fuel tank.

BRIEF DESCRIPTION OF THE DRAWINGS

The invention permits numerous embodiments. In order to make its basic principle even clearer, several of these are illustrated in the drawing and are described below. In the drawing.

DETAILED DESCRIPTION OF THE PREFERRED EMBODIMENTS

Figure 1:
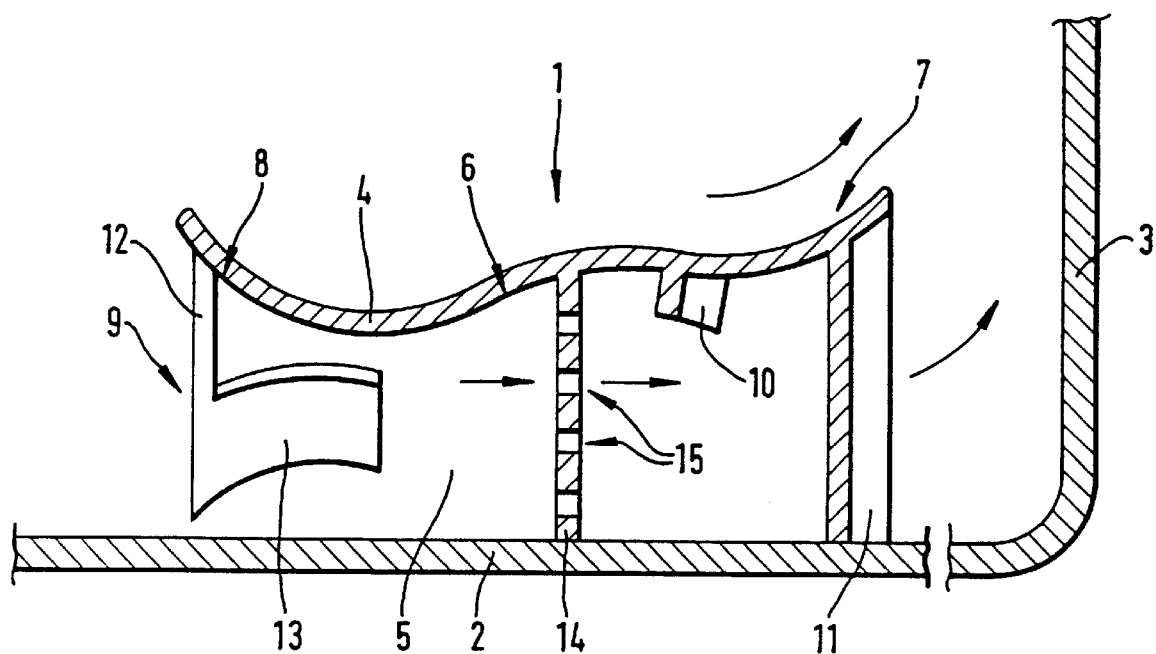
FIG. 1 shows a channel arranged in a fuel tank and delimited by a guide plate.

FIG. 1 shows the lower region of a fuel tank 1 with a bottom 2 and with a lateral wall 3. Arranged in the fuel tank 1 is a guide plate 4 which, together with the bottom 2, forms a channel 5. The channel 5 has a calming region 6 with a cross-sectional widening. The calming region 6 is followed by an outflow region 7 with a cross section larger than the cross section of the calming region 6. A funnel-shaped inflow region 8 is arranged upstream of the calming region 6. A guide element 9–11 is fastened in each case in the inflow region 8, the calming region 6 and the outflow region 7.

The guide element 9 arranged in the inflow region 8 has a resilient arm 12, to which a guide wing 13 is fastened. When a flow of fuel impinges onto the guide wing 13, the arm 12 is rotated according to the flow velocity. The flow is thereby first damped and partially deflected to the side. Arranged in the calming region 6 is a damming element 14 which throttles the flow velocity of the fuel. The damming element 14 has a multiplicity of passages 15, through which the fuel flows. The throttled flow is subsequently deflected at a flat angle toward the wall 3 of the fuel tank 1 by the guide elements 10, 11 arranged in the calming region 6 and in the outflow region 7. Fuel flowing over the guide plate 4 is deflected upward by that part of the guide plate 4 which forms the outflow region 7. This prevents fuel accelerated in the direction of the wall 3 of the fuel tank 1 from impinging on the wall 3. For the sake of clarity, the flow of fuel is marked by arrows in the drawing.

Figure 2:
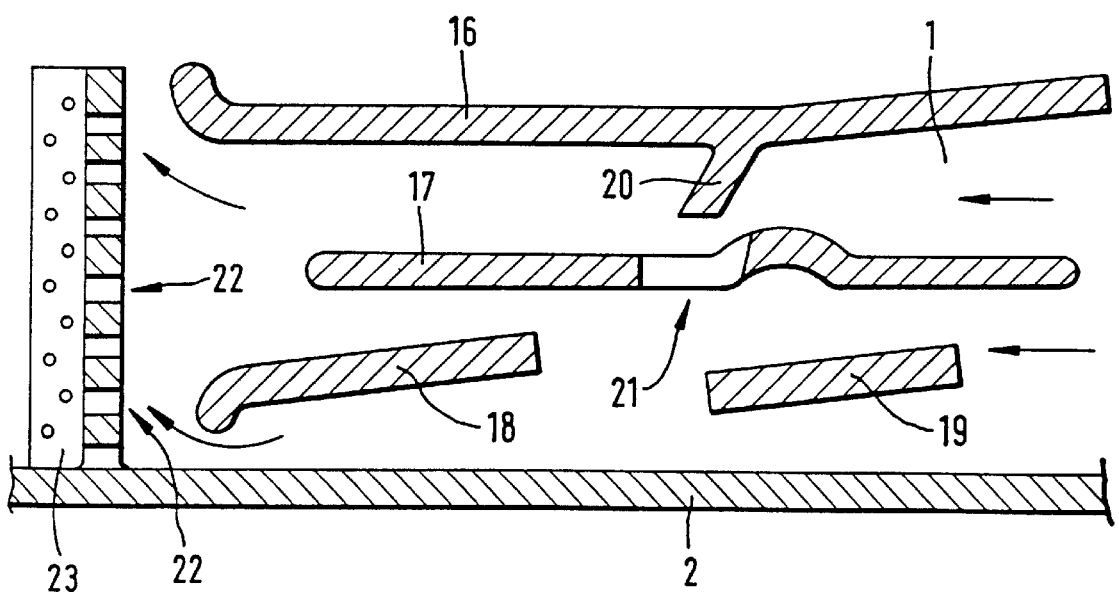
FIG. 2 shows a plurality of guide plates arranged above a bottom of the fuel tank.

FIG. 2 shows several guide plates 16–19 arranged one above the other and next to one another in the fuel tank 1. The uppermost guide plate 16 runs largely parallel to the bottom 2 of the fuel tank 1 and is connected in one piece to a guide element 20 pointing obliquely downward. The middle guide plate 17 has an orifice 21, through which fuel can flow. The two lower guide plates 18, 19 are arranged so as to be inclined from right to left. Fuel flowing from right to left loses a large proportion of its kinetic energy. The throttled flow subsequently arrives at a vertical guide element 23 provided with a multiplicity of passages 22. Some of the fuel passes through the passages 22 of the guide element 23. However, the largest part of the flow is deflected into the drawing plane by the guide element 23. By virtue of this design, the flow is throttled and subsequently deflected laterally when the fuel is at any filling level in the fuel tank 1.

Figure 3:
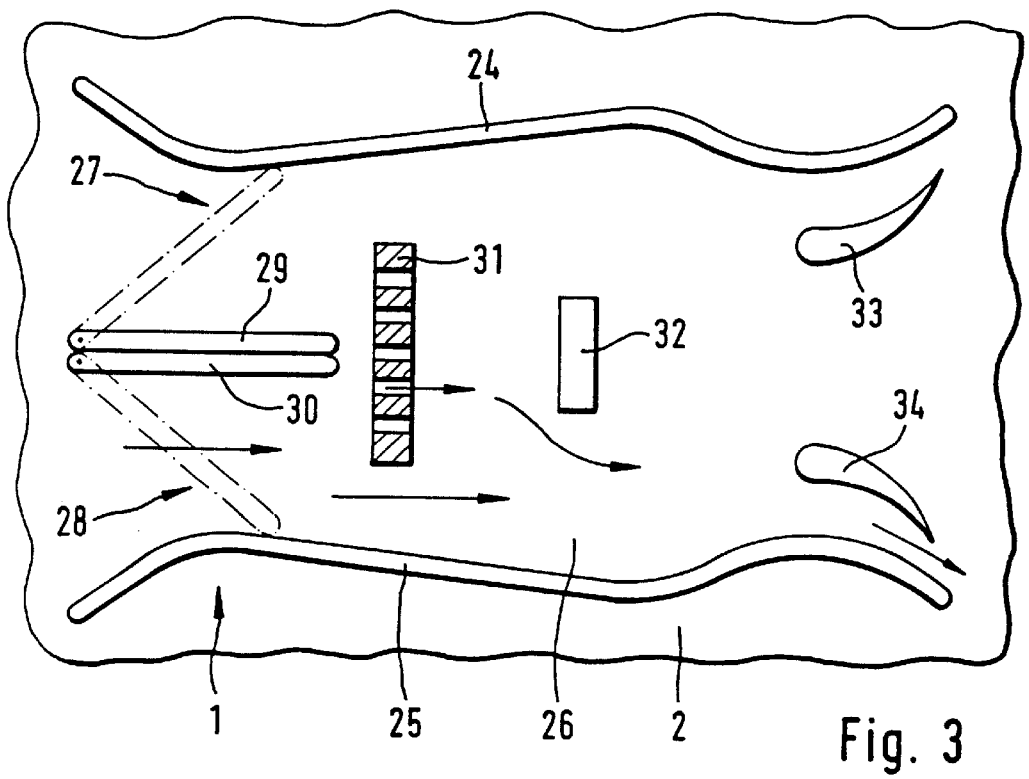
FIG. 3 shows guide elements and guide plates fastened to the bottom of the fuel tank.

FIG. 3 shows, in a top view of the bottom 2 of the fuel tank 1, a channel 26 formed by two guide plates 24, 25. Arranged in the inlet-side region of the channel 26 are two flap valves 27, 28 with wing doors 29,30 which, in the position shown, allow the fuel to flow through the channel 26 from left to right. When the fuel flows from right to left, the wing doors 29, 30 move apart, until they come up against the guide plates 24, 25 and close the channel 26. The wing doors 29, 30 closing the channel 26 are marked by dashes and dots in the drawing. Furthermore, two damming elements 31, 32 and two wing-shaped guide elements 33, 34 are arranged in the channel 26. The damming elements 31, 32 throttle the flow, whilst the guide elements 33, 34 deflect the flow to the side.

Figure 4:
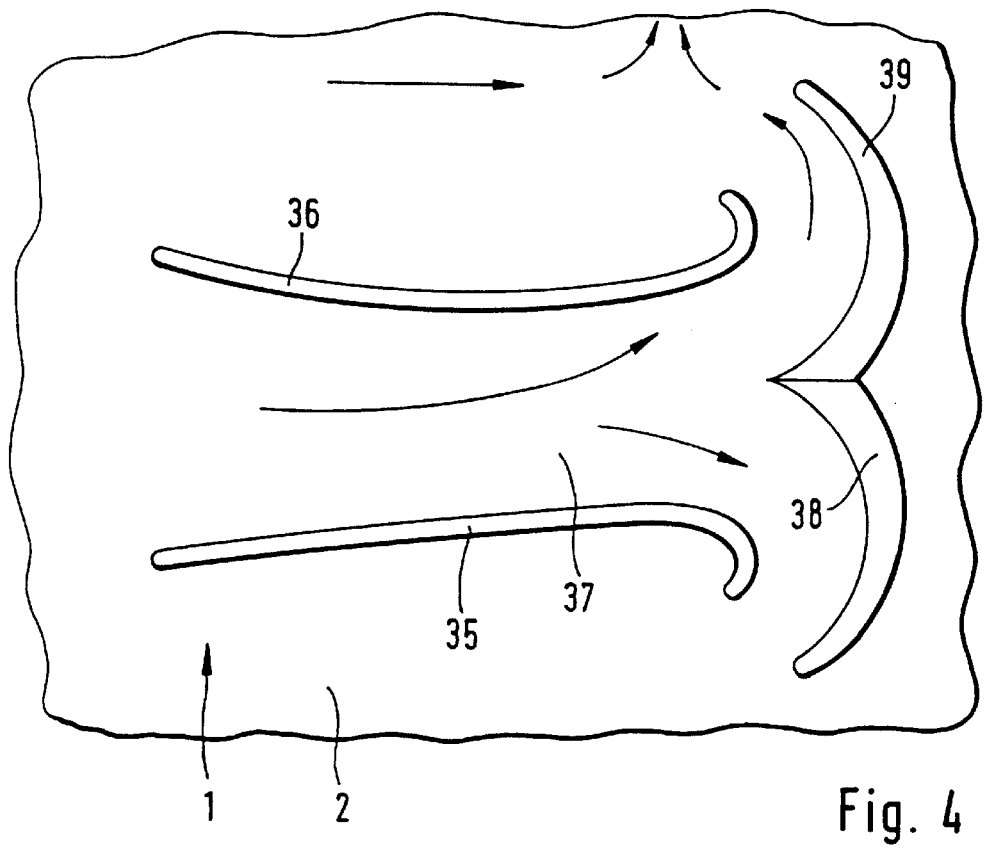
FIG. 4 shows guide elements provided for the reversal of flow.

FIG. 4 shows another embodiment of the invention, in which two guide plates 35, 36 standing vertically on the bottom 2 of the fuel tank 1 form a channel 37. Two scoop-shaped guide elements 38, 39 are arranged at the end of the channel 37. These guide elements 38, 39 deflect a flow, led through the channel 37, back on the outside of the guide plates 35, 36. As a result, fuel flowing past the guide plates 35, 36 on the outside is deflected by the fuel deflected by the guide elements 38, 39.

What is claimed is:

1. A device for the reduction of splashing noises in a fuel tank of a motor vehicle, with damping elements arranged in the fuel tank, wherein the damping elements having various orientations in the tank as a whole are designed as guide elements and/or guide plates for deflecting the flow of fuel onto a wall of the fuel tank at an angle different from 90° and/or for throttling the velocity of the flow, and wherein the guide plates form relative to one another a channel.

2. The device as claimed in claim 1, wherein the channel has at least a portion having a graduated cross-sectional widening as a calming region.

3. The device as claimed in claim 2, wherein a funnel-shaped inflow region is arranged upstream of the calming region.

4. The device as claimed in claim 1 wherein guide plates forming the channel are arranged in opposite regions of the fuel tank.

5. The device as claimed in claim 2 wherein guide plates forming the channel are arranged in opposite regions of the fuel tank.

6. The device as claimed in claim 3 wherein guide plates forming the channel are arranged in opposite regions of the fuel tank.

* * * * *